No. 659,541. Patented Oct. 9, 1900.
J. T. & C. G. MARTIN.
AUTOMATIC CUT-OFF FOR CISTERNS.
(Application filed June 23, 1900.)
(No Model.)
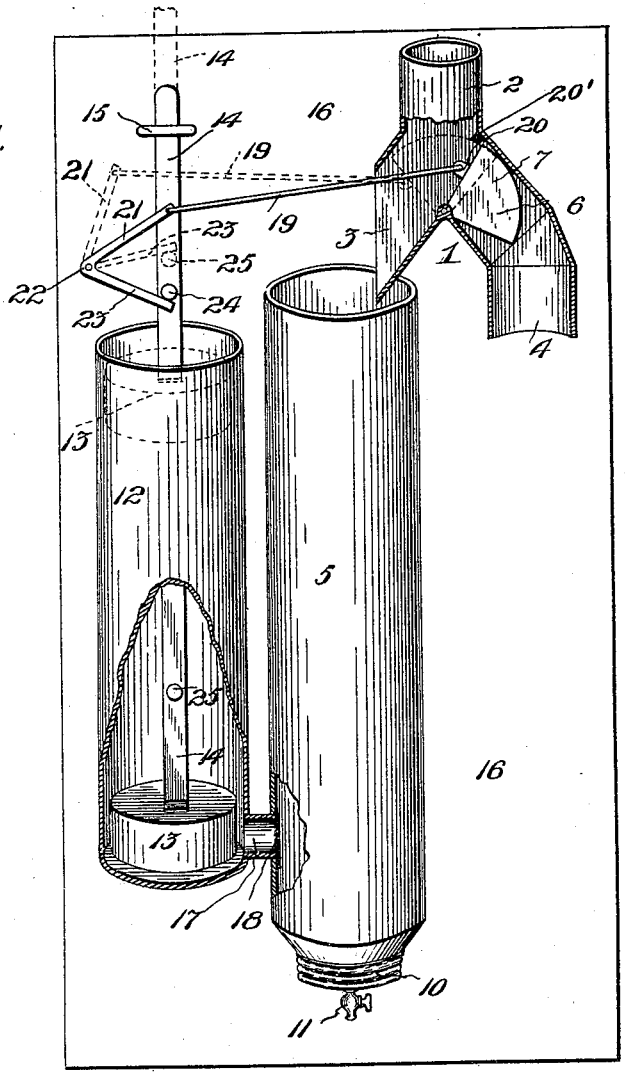
Inventors:
J. T. Martin
C. G. Martin

UNITED STATES PATENT OFFICE.

JACKSON T. MARTIN AND CLARENCE G. MARTIN, OF SPRINGFIELD, MISSOURI.

AUTOMATIC CUT-OFF FOR CISTERNS.

SPECIFICATION forming part of Letters Patent No. 659,541, dated October 9, 1900.

Application filed June 23, 1900. Serial No. 21,292. (No model.)

*To all whom it may concern:*

Be it known that we, JACKSON T. MARTIN and CLARENCE G. MARTIN, citizens of the United States, residing at Springfield, in the county of Greene and State of Missouri, have invented certain new and useful Improvements in Automatic Cut-Offs for Cisterns; and we do declare the following to be a full, clear, and exact description of the invention, such as will enable others skilled in the art to which it appertains to make and use the same.

Our invention relates to improvements in cut-offs of that character interposed between a gutter-pipe and a cistern for cutting off the flow of the first water containing refuse from the roof and then allowing the clear water to run into the cistern.

The object of the invention is to provide a cut-off which is simple and efficient in construction and operation, entirely automatic in action, and adapted when open to allow water to flow into the cistern and strain the same and exclude any refuse matter carried thereby.

With this and other minor objects in view the invention consists of certain novel features of construction, combination, and arrangement of parts, as will be hereinafter more fully described, and particularly pointed out in the appended claims.

In the accompanying drawings, Figure 1 is a perspective view, with parts broken away, of a cut-off embodying our invention, showing in full lines the valve arranged to cut off the flow of water from the cistern and in dotted lines to cut off the flow of water to the waste-tank, so as to allow it to enter the cistern. Fig. 2 is a perspective view of the valve. Fig. 3 is a cross-section thereof.

In the practical operation of this invention it is intended that it be located in the immediate vicinity of the cistern or tank for collecting rain-water and operate so as to cut off the flow of the first water from the roof—that is, the water that contains the refuse, &c., upon the roof—and conduct it into a waste-tank and then to automatically shut off the flow of water to the waste-tank, so as to conduct the clear water to the cistern.

Referring now more particularly to the drawings, the numeral 1 represents a valve-casing having an inlet-tube 2 for connection with a rain-water pipe leading from the gutters of a house and diverging spouts or outlets 3 and 4, the spout 3 being arranged to discharge into a waste-tank 5 and the spout 4 into a cistern of any approved construction. (Not shown.)

20' represents a scraper arranged in the casing to prevent leaves and other rubbish from working between the valve and casing when water is passing to the cistern and also to remove all debris from the perforated top 9 as the valve swings down into the spout 4.

Located between the two spouts or outlets is a valve 6, constructed of approximately V-shaped end pieces 7 and inclined side pieces 8 and a convex top 9, thus forming a cut-off which is closed at each end and one side and open at the other side. This valve is pivoted at its vertex or narrow base portion to the casing and is adapted to swing down into the spout or outlet 4 to cut off the flow of water to the cistern and allow it to pass through the spout 3 into the waste-tank and to assume a substantially vertical position to cut off the flow of water to said tank and allow the same to pass through the spout 4 to the cistern. As shown, the closed side of the valve faces the spout or outlet 3, while the open side thereof faces in the direction of the spout or outlet 4. When the valve is arranged in the full-line position shown in Fig. 1, wherein it is represented as swung to the right into the spout or outlet 4, the water entering through the inlet 2 is wholly diverted from the spout 4 and caused to flow through the spout 3 into the drip-tank. When, on the other hand, the valve is arranged in a substantially vertical position, as shown in broken lines in Fig. 1, the water entering through the inlet 2 passes through the perforated top 9 of the valve and through the open side thereof into spout 4, whence it flows into the cistern. It will thus be seen that the water passing to the cistern is at all times strained, the perforated top 9 of the valve serving to exclude leaves and all other foreign matter washed down from the roof, so that the water flows clear to the cistern.

The waste-tank 5 has its upper end open and arranged immediately below the spout or outlet 3, so as to receive the water therefrom, and is closed at its lower end by means of a screw-cap 10, which may be readily removed at any time to clean the tank and rid it of the accumulation of refuse matter. To this cap is applied a waste or drip cock 11, through which the water exhausts from the tank in the manner and for the purpose hereinafter described.

Arranged alongside the drip-tank 5 is a float-tank 12, in which is movably mounted a float 13, carried by a rod, piston, or plunger 14, mounted to slide at its upper end in guides 15 upon a board or other suitable base-support 16, upon which all the parts of the apparatus are mounted. The lower end of the float-tank is connected with the lower end of the waste-tank through the medium of a short lateral pipe or conductor 17, so that the water from the waste-tank may flow into the float-tank to operate the float 13, a screen of wirework or other suitable material 18 being located in said pipe or conductor to prevent leaves and other refuse passing from the waste-tank into the float-tank along with the water.

The valve is automatically operated by the float to control the flow of the water to the waste-tank or the cistern through the medium of a laterally-shiftable operating-rod 19, connected at one end to ears 20, secured to the side 8 thereof, and at its opposite end to one arm 21 of a bell-crank lever 22, pivoted to the side piece 16. The other arm 23 of this bell-crank lever is located within the path of two tappet-lugs or projections 24 and 25, carried by the float-plunger 14 and serve, as the float descends and ascends in its tank 12, to operate said bell-crank lever and move the operating-arm 19 in one direction or the other to bring the valve into position to cut off the flow of water from either the waste-tank or the cistern.

In the practical operation of the invention the parts are normally arranged as shown in full lines in Fig. 1, the valve being shown located to cause the first flow of the rain-water from the roof into the waste-tank 5, so as to prevent the refuse washed from the roof from passing into the cistern. The water upon rising in the waste-tank 5 to the level of the bottom of the float-tank passes through the short pipe 17 into said float-tank and gradually forces the float 13 upward as it rises therein. When the float reaches the limit of its upward movement, the tappet-lug or projection 25 comes in contact with the lower arm 23 of the bell-crank lever 22 and swings the same upwardly, whereby the upper arm 21 of said bell-crank lever is caused to draw the operating-rod 19 upwardly and laterally to the left, as shown in broken lines in Fig. 1, by which the valve is moved to an upright position, so as to cut off the flow of the water from the waste-tank 5 and cause it to pass through the spout or outlet 4 into the cistern, the water in passing through the valve, in the manner hereinbefore described, being strained, so as to rid it of any foreign matter which may be carried thereby. It will thus be seen that at the beginning of a rain the first water from the roof—that is, the water that contains the refuse washed from the roof—is diverted from the cistern and caused to pass into the waste-tank, and through the medium of the float and connections the valve is operated at a predetermined time to cut off the flow of water from the drip-tank and cause it to pass into the cistern after a certain quantity has passed down into the drip-tank, and the inflowing water becomes clear. By this means the cistern is kept clear of dirt, leaves, and other refuse matter, and nothing but clean water is allowed to enter therein, so that frequent cleaning of the cistern is unnecessary. The water contained in the float and waste tanks gradually exhausts therefrom through the drip or waste cock 11, which may be set to effect the exhaust in any desired period of time. The float thus gradually lowers in the tank 12 until the tappet-lug or projection 24 comes in contact with the arm 23 of the bell-crank lever 22, which is forced down until the parts assume the full-line position shown in Fig. 1, in which the valve is represented as having been forced out of an upright position down into the spout 4 of the valve-casing, so as to again divert the flow of water from the cistern into the tank 5, thus automatically resetting the apparatus for operation when another rain comes.

From the foregoing description, taken in connection with the accompanying drawings, the construction and mode of operation of our invention will be readily understood, and it will be seen that it provides a simple and effective device which is entirely automatic in action and requires no attention beyond removing the accumulated refuse from the waste-tank. It will be understood that in practice the board or base support 16 is secured to the house or to a suitable framework adjacent to the cistern and that the inlet of the valve-casing is connected to the usual roof-gutter through the medium of a suitable pipe or conductor.

Having thus fully described our invention, what we claim as new therein, and desire to secure by Letters Patent, is—

1. In a cut-off for cisterns and the like, the combination with a valve-casing having outlets to discharge into a cistern and waste-tank, of a valve mounted in said casing and controlling said outlets and provided with a strainer to prevent the passage of refuse when mounted in position to cause the water to pass into the cistern, and a scraper for automatically removing the debris from said strainer as the valve is swung to the reverse position, substantially as set forth.

2. In a cut-off for cisterns and the like, the combination with the casing having outlets to discharge the water into a cistern and a waste-tank, of a valve pivotally mounted in said casing to swing laterally and control said outlets and having a closed side facing the waste-tank outlet and an open side facing the cistern-outlet, and a strainer-top in communication with said open side and through which the water is adapted to pass in flowing into the cistern-outlet, said closed side serving as the valve proper to control said outlets, substantially as described.

3. In a cut-off for cisterns and the like, the combination with the valve-casing having outlets to discharge into a waste-tank and a cistern, of a valve in said casing comprising substantially V-shaped end pieces, a side piece and a perforated top, forming a cut-off having a closed side facing the waste-tank outlet and an open side facing the cistern-outlet, said open side being in communication with the perforated top, and means for operating the valve, substantially as described.

4. In a cut-off for cisterns and the like, the combination with the valve-casing having outlets to discharge into a waste-tank and a cistern, of a waste-tank provided with means for regulating the discharge of the water therefrom, a float-tank in communication with the waste-tank, a float in the float-tank and adapted to rise and fall with the water therein, a plunger connected to the float and carrying spaced tappet devices, a bell-crank lever adapted to be actuated by said tappet devices, a swinging valve in the valve-casing, and a laterally-shiftable rod connecting between said bell-crank lever and the valve, substantially as described.

In testimony whereof we have hereunto set our hands in presence of two subscribing witnesses.

JACKSON T. MARTIN.
CLARENCE G. MARTIN.

Witnesses:
GEO. B. FAIRBANKS,
F. P. AGNEW.